United States Patent
Chang et al.

(10) Patent No.: US 10,801,635 B2
(45) Date of Patent: Oct. 13, 2020

(54) FIXING STRUCTURE FOR PROTECTIVE COVER OF VALVE ASSEMBLY

(71) Applicant: Globe Union Industrial Corp., Taichung (TW)

(72) Inventors: Tachun Chang, Taichung (TW); Yueping Xiao, Shen Zen (CN); Kaizhong He, Shen Zen (CN)

(73) Assignee: Globe Union Industrial Corp., Taichung (TW)

(\*) Notice: Subject to any disclaimer, the term of this patent is extended or adjusted under 35 U.S.C. 154(b) by 85 days.

(21) Appl. No.: 16/021,320

(22) Filed: Jun. 28, 2018

(65) Prior Publication Data
US 2019/0242489 A1 Aug. 8, 2019

(30) Foreign Application Priority Data
Feb. 8, 2018 (CN) .................... 2018 2 0229229 U (51) Int. Cl.
| | |
|---|---|
| *F16K 27/12* | (2006.01) |
| *E03C 1/04* | (2006.01) |
| *F16K 27/02* | (2006.01) |
| *E03C 1/02* | (2006.01) |
| *F24D 19/10* | (2006.01) |

(52) U.S. Cl.
CPC .............. *F16K 27/12* (2013.01); *E03C 1/023* (2013.01); *E03C 1/0404* (2013.01); *F16K 27/0263* (2013.01); *F24D 19/1015* (2013.01); *F24D 2220/0242* (2013.01); *F24D 2220/0257* (2013.01)

(58) Field of Classification Search
CPC .......... E03C 1/021; E03C 1/023; E03C 1/042; E03C 2001/026; E03C 2001/028; F16K 27/0263; F16K 27/12
USPC .................................................. 137/359, 360
See application file for complete search history.

(56) References Cited

U.S. PATENT DOCUMENTS

| | | | | |
|---|---|---|---|---|
| 4,896,381 A | * | 1/1990 | Hutto ...................... | E03C 1/042 |
| | | | | 137/359 |
| 5,031,658 A | * | 7/1991 | Brattoli ................... | E03C 1/042 |
| | | | | 137/360 |
| 8,627,844 B2 | * | 1/2014 | Allen ............................ | 137/359 |
| 9,222,244 B2 | * | 12/2015 | Holt ........................ | E03B 9/025 |

(Continued)

*Primary Examiner* — Kevin F Murphy
*Assistant Examiner* — Jonathan J. Waddy
(74) *Attorney, Agent, or Firm* — Alan D. Kamrath; Karin L. Williams; Mayer & Williams PC (57) ABSTRACT

A valve assembly capable of indicating a depth contains: a body includes a holder. The holder includes a cold-water inflow connector, a hot-water inflow connector, a first outflow connector, and a second outflow connector. The cold-water inflow connector has a cold-water inflow seat configured to connect with a cold-water inflow pipe, and the hot-water inflow connector has a hot-water inflow seat configured to connect with a hot-water inflow pipe. The holder further includes a first coupling portion and a second coupling portion. The positioning plate includes the opening for fitting with the holder, a first fixing portion formed around the opening, a second fixing portion formed around the opening, and at least two recesses arranged around the opening, wherein the first fixing portion is configured to connect with the first coupling portion, and the second fixing portion is configured to couple with the second coupling portion.

30 Claims, 12 Drawing Sheets

(56) References Cited

U.S. PATENT DOCUMENTS

| | | | |
|---|---|---|---|
| 2004/0050423 A1* | 3/2004 | Schoenweger | E03C 1/021 137/360 |
| 2006/0231140 A1* | 10/2006 | McNerney | E03C 1/021 137/360 |
| 2009/0007971 A1* | 1/2009 | Ball | E04G 15/061 137/315.12 |
| 2010/0116359 A1* | 5/2010 | Ball | E03C 1/042 137/360 |
| 2011/0100484 A1* | 5/2011 | Allen | E03C 1/023 137/359 |
| 2012/0145258 A1* | 6/2012 | Yang | E03C 1/042 137/359 |
| 2015/0191900 A1* | 7/2015 | Johnson | E03C 1/023 137/625.19 |
| 2017/0002551 A1* | 1/2017 | Zhou | E03C 1/021 |
| 2017/0059053 A1* | 3/2017 | Aykens | E03C 1/021 |
| 2019/0085539 A1* | 3/2019 | Li | E03C 1/042 |

\* cited by examiner

FIXING STRUCTURE FOR PROTECTIVE COVER OF VALVE ASSEMBLY

FIELD OF THE INVENTION

The present invention relates to a temperature control valve or a thermostatic valve of bathroom equipment, and more particularly to a fixing structure for a protective cover of a valve assembly.

BACKGROUND OF THE INVENTION

A temperature control valve or a thermostatic valve assembly of bathroom equipment is employed to adjust or set a temperature of a water supply. A conventional valve assembly is mounted on a wall of a bathroom and contains a body on which a holder is formed. The holder includes an accommodation chamber configured to accommodate a mixing valve covered by a decoration cover, and the holder includes a control bar for controlling the mixing valve. The holder includes a cold-water inflow connector horizontally extending from a first side thereof, a hot-water inflow connector horizontally extending from a second side of the holder opposite to the cold-water inflow connector, a first outflow connector, and a second outflow connector. Thereby, after cold water from the cold-water inflow connector and hot water from the hot-water inflow connector flow into the holder, they are controlled by the control bar so as to adjust flow and mixing rate of mixing water of the cold water and the hot water in the mixing valve, and the mixing water is controlled to flow toward the first outflow connector and the second outflow connector at a predetermined flow and a set temperature. Furthermore, the mixing valve mates with a pressure balance valve so as to obtain a constant temperature.

The first outflow connector is in connection to a shower via an upper water tube, and the second outflow connector is coupled to a faucet via a lower water tube. The cold-water inflow connector has a first fixer configured to house a first stop set, and the hot-water inflow connector has a second fixer configured to house a second stop set, such that the cold water and the hot water respectively flowing through the cold-water inflow connector and the hot-water inflow connector are controlled to flow or stop flowing in maintenance.

In construction of a building, the cold-water inflow pipe, the hot-water inflow pipe, and the mixing-water outflow pipe are housed in a basic wall, such as a wooden wall, so as to test water leakage. Thereafter, tiles or other decoration materials are adhered on the basic wall. To avoid damage the valve assembly, a protective cover is connected with the body so as to protect the accommodation chamber.

A front fence of the protective cover has a depth higher than the basic wall and equal to a depth of construction, and outer walls of the tiles and other decoration material flush with the protective cover, after adhering the tiles or other decoration materials on the basic wall. To preserve the depth, a height of the protective cover higher than the basic wall is measured by a ruler or other measurement tools, when the valve assembly is locked on a wooden rack in the basic wall, thus causing measurement inconvenience and errors.

Before testing the water leakage, the protective cover is removed from the holder by unscrewing the screw bolts from the protective cover and the holder so as to fix a testing lid in the accommodation chamber, thus testing the water leakage. Thereafter, the protective cover is connected with the holder by screwing the screw bolts via the holder and the protective cover, after testing the water leakage and detaching the testing lid, thus having troublesome test of the water leakage.

The present invention has arisen to mitigate and/or obviate the afore-described disadvantages.

SUMMARY OF THE INVENTION

The primary aspect of the present invention is to provide a fixing structure for a protective cover of a valve assembly which connects or removes the protective cover with or from the body easily and quickly.

Another aspect of the present invention is to provide a fixing structure for a protective cover of a valve assembly which avoid fixes the protective cover incorrectly so as to facilitate installation and depth adjustment.

To obtain the above aspects, a fixing structure for a protective cover of a valve assembly provided by the present invention contains: a body including a holder.

The holder includes a cold-water inflow connector horizontally extending from a first side thereof, a hot-water inflow connector horizontally extending from a second side of the holder opposite to the cold-water inflow connector, a first outflow connector vertically extending from a top of the holder, and a second outflow connector vertically extending from a bottom of the holder opposite to the first outflow connector. The cold-water inflow connector has a cold-water inflow seat configured to connect with a cold-water inflow pipe, and the hot-water inflow connector has a hot-water inflow seat configured to connect with a hot-water inflow pipe. The holder further includes a first coupling portion and a second coupling portion extending on an outer wall thereof.

The positioning plate includes the opening configured to fit with the holder of the body, and the positioning plate including a first fixing portion, a second fixing portion, and at least two recesses, wherein the first fixing portion is configured to connect with the first coupling portion, and the second fixing portion is configured to couple with the second coupling portion.

DETAILED DESCRIPTION OF THE PREFERRED EMBODIMENTS

With reference to FIGS. 1-4, a fixing structure for a protective cover 30 of a valve assembly 1 according to a preferred embodiment of the present invention comprises: a body 10, a positioning plate 20, and the protective cover 30.

Figure 5:
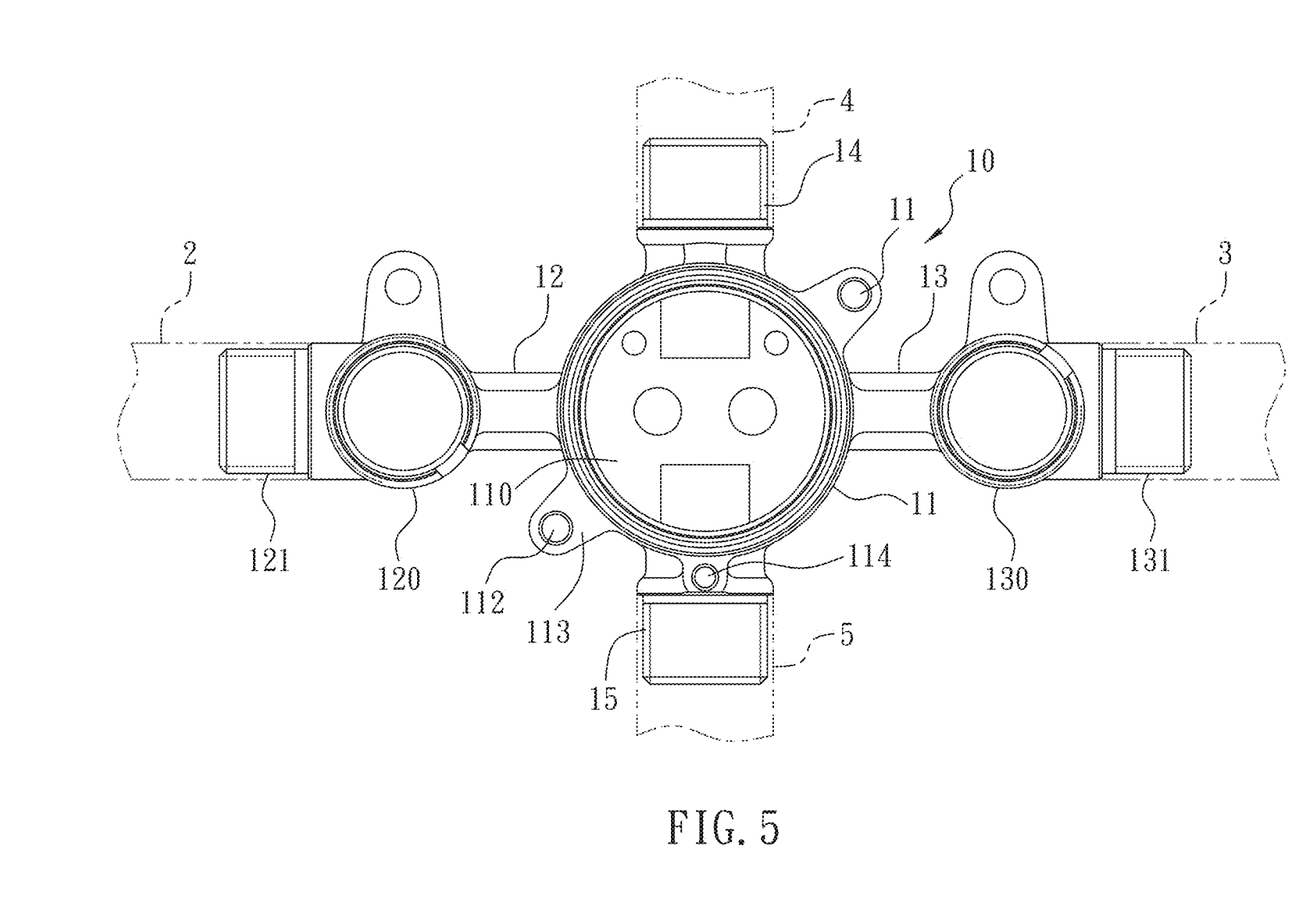
FIG. 5 is a side plan view showing the operation of a part of the valve assembly according to the first embodiment of the present invention.

The body 10 is mounted in a basic wall W, such as a wooden rack W1 housed in the basic wall W. As shown in FIG. 5, the body 10 includes a holder 11, wherein the holder 11 includes a cold-water inflow connector 12 horizontally extending from a first side thereof, a hot-water inflow connector 13 horizontally extending from a second side of the holder 11 opposite to the cold-water inflow connector 12, a first outflow connector 14 vertically extending from a top of the holder 11, and a second outflow connector 15 vertically extending from a bottom of the holder 11 opposite to the first outflow connector 14; the cold-water inflow connector 12 has a cold-water inflow seat 121 configured to connect with a cold-water inflow pipe 2, and the hot-water inflow connector 13 has a hot-water inflow seat 131 configured to connect with a hot-water inflow pipe 3; the holder 11 further includes a first coupling portion 111 and a second coupling portion 112 extending on an outer wall thereof.

The holder 11 further includes an accommodation chamber 110 configured to accommodate a mixing valve and a control bar for controlling the mixing valve so that after cold water from the cold-water inflow connector 12 and hot water from the hot-water inflow connector 13 flow into the holder 11, they are controlled by the mixing valve and the control bar to mix in the first outflow connector 14 or the second outflow connector 15 at a predetermined flow and a predetermined temperature. The mixing valve mates with a pressure balance valve so as to obtain a constant temperature in the first outflow connector 14 or the second outflow connector 15. The first outflow connector 14 is in connection to a shower via an upper water tube 4, and the second outflow connector 15 is coupled to a faucet via a lower water tube 5. Since the mixing valve, the control bar, the shower, and the faucet are well-known art, further remarks are not disclosed in FIGS. 1-15.

Figure 4:
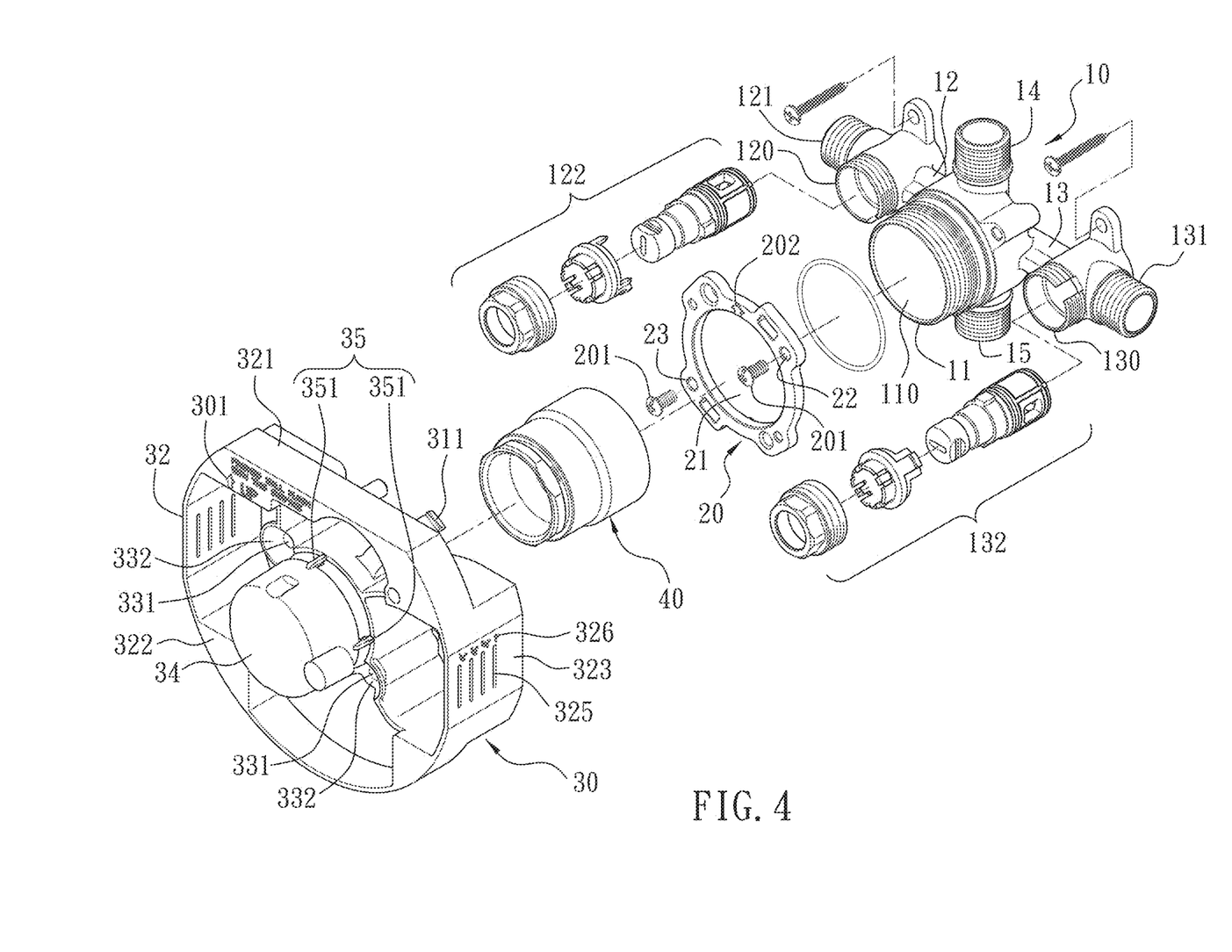
FIG. 4 is a perspective view showing the exploded components of the valve assembly according to the first embodiment of the present invention.

Referring to FIG. 4, the cold-water inflow connector 12 has a first fixer 120 configured to house a first stop set 122, and the hot-water inflow connector 13 has a second fixer 130 configured to house a second stop set 132, such that the cold water and the hot water respectively flowing through the cold-water inflow connector 12 and the hot-water inflow connector 13 are controlled to flow or stop flowing. Preferably, the first stop set 122 and the second stop set 132 are replaceable in other manners.

Figure 6:
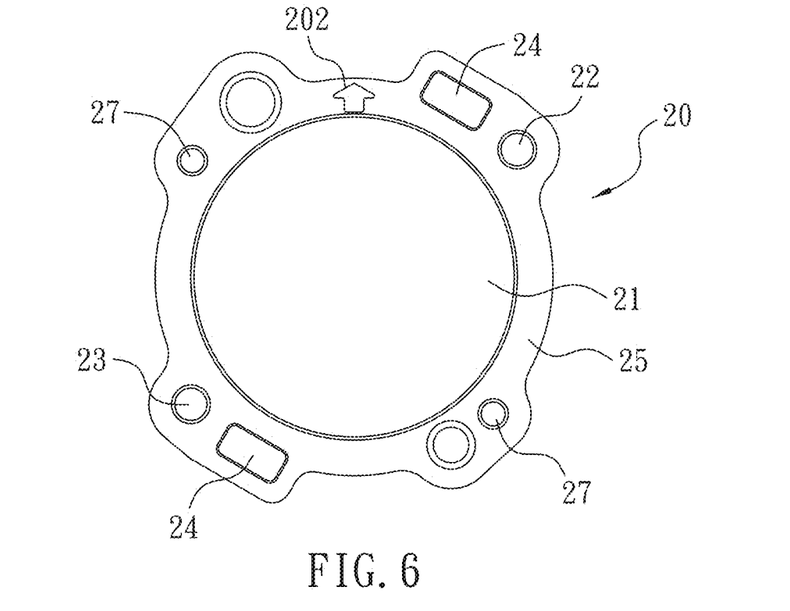
FIG. 6 is another side plan view showing the assembly of a part of the valve assembly according to the first embodiment of the present invention.
Figure 7:
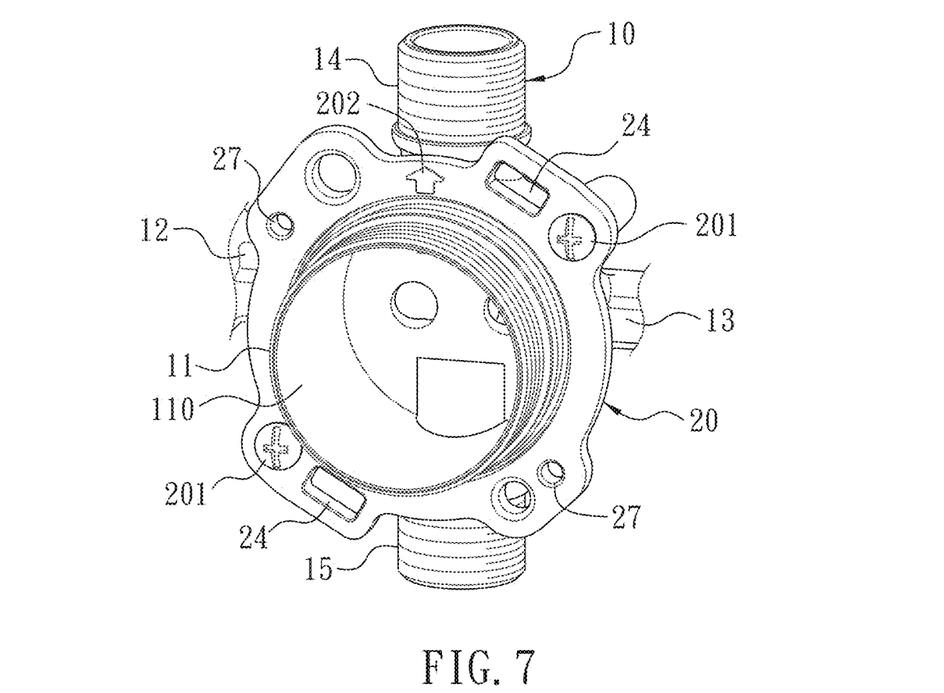
FIG. 7 is a perspective view showing the assembly of a part of the valve assembly according to the first embodiment of the present invention.

Referring to FIGS. 5-7, the positioning plate 20 includes the opening 21 defined therein and configured to fit with the holder 11 of the body 10, and the positioning plate 20 includes a first fixing portion 22 formed around the opening 21, a second fixing portion 23 formed around the opening 21, and at least two recesses 24, wherein the first fixing portion 22 is configured to connect with the first coupling portion 111, and the second fixing portion 23 is configured to couple with the second coupling portion 112.

The positioning plate 20 is annular and is made of metal, and the first fixing portion 22, the second fixing portion 23, and at least two recesses 24 are all formed around the opening 31.

Figure 3:
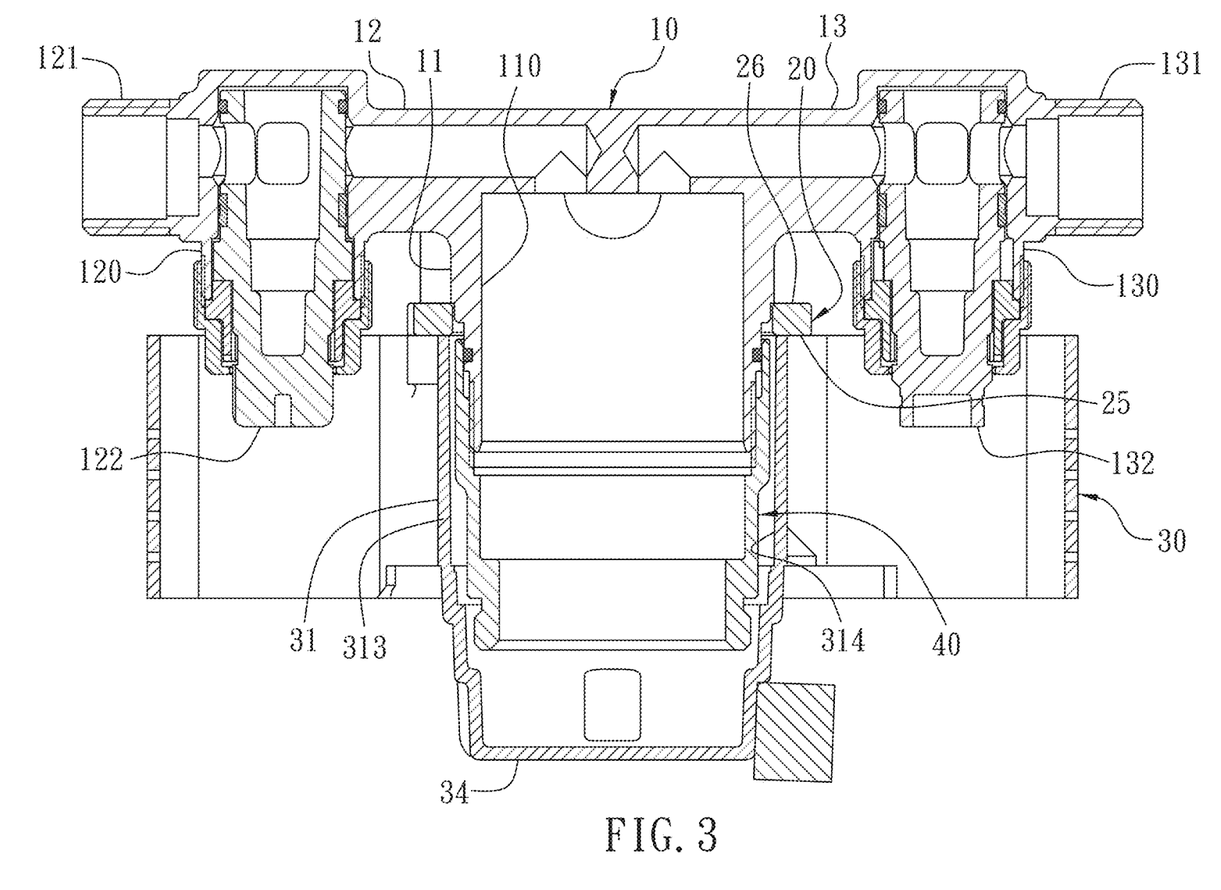
FIG. 3 is a cross sectional view showing the assembly of the valve assembly according to the first embodiment of the present invention.
Figure 8:
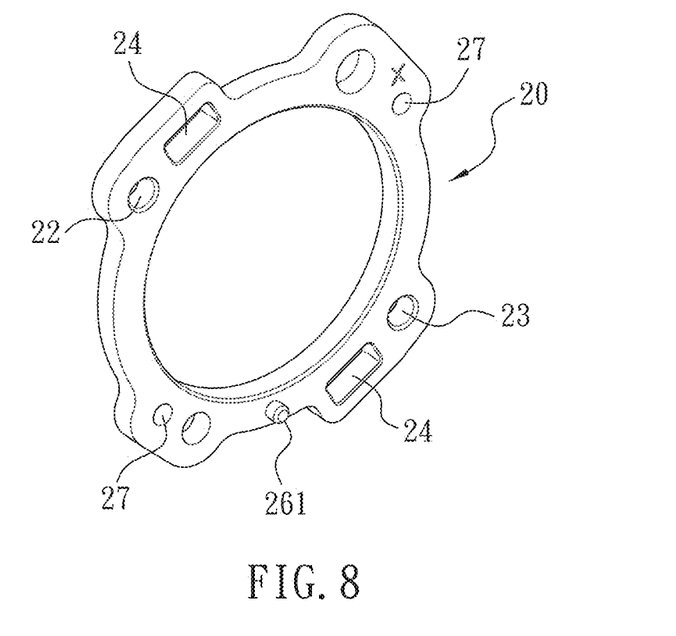
FIG. 8 is another perspective view showing the assembly of a part of the valve assembly according to the first embodiment of the present invention.

The holder 11 of the body 10 includes an abutting fence 113 formed thereon and an aperture 114 defined on the abutting fence 113; the abutting fence 113 is defined by three tabs and a stepped fringe, wherein one of the three tabs has the first coupling portion 111 arranged thereon, another tab has the second coupling portion 112 formed thereon, and the other tab has the aperture 114 defined thereon. As illustrated in FIG. 3, the positioning plate 20 includes an outer face 25 and an inner face 26 configured to contact with the abutting fence 113, and the inner face 26 having a column 261 configured to insert into the aperture 114, as shown in FIG. 8, such that the positioning plate 20 is mounted on the holder 11 of the body 10 quickly and arcuately, the first fixing portion 22 is connected with the first coupling portion 111, and the second fixing portion 23 is coupled with the second coupling portion 112.

Each of the first coupling portion 111 and the second coupling portion 112 is a threaded hole. Each of the first fixing portion 22 and the second fixing portion 23 is a through hole so that the column 261 is inserted into the aperture 114 so as to align the threaded hole with the through hole, and a first screw bolt 201 screws with the threaded hole via the through hole, thus screwing the positioning plate 20 on the holder 11 quickly and securely.

Figure 9:
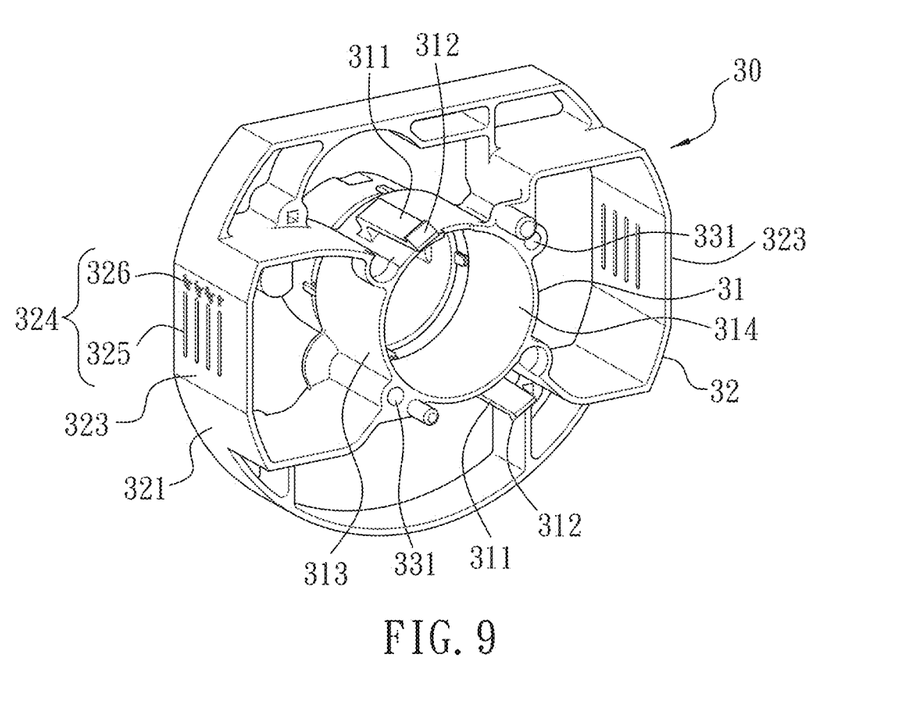
FIG. 9 is also another perspective view showing the assembly of a part of the valve assembly according to the first embodiment of the present invention.

Referring to FIGS. 3 and 9, the protective cover 20 is connected with the body 10, and the protective cover 20 includes a fitting portion 31 configured to fit with the holder 11 of the body 10, the fitting portion 31 has at least two flexible feet 311 arranged thereon so as to retain with the at least two recesses 24 of the positioning plate 20 individually.

Each of the at least two flexible feet 311 has a hook 312 formed on a distal end of each flexible foot 311 so that each flexible foot 311 retains with the inner face 26 of the positioning plate 20 via each of the at least two recesses 24 after flexibly deforming.

The protective cover 30 further includes a peripheral portion 32 surrounding the fitting portion 31, and multiple connection portions 33 configured to connect with the fitting portion 31 and the peripheral portion 32; wherein the peripheral portion 32 has an external fence 321, a front fence 322, a marking portion 323 formed on at least one side of the external fence 321, and multiple indication parts 324 arranged on the marking portion 323 and configured to denote depths among the multiple indication parts 324 and the front fence 322 respectively. The protective cover 20 includes two marking portions 323 arranged on two sides of the external fence 321 individually.

Each of the multiple indication parts 324 has at least one elongated element 325 longitudinally arranged thereon, wherein each elongated element 325 is any one of a through hole, a recessed slot, and a rib. Alternatively, each elongated element 325 is any one of a protrusion, a depression, and a stepped element.

Each indication part 324 further has a size symbol 326 corresponding to each elongated element 325 so as to denote a depth between each elongated element 325 and the front fence 322.

The fitting portion 31 of the protective cover 30 has a cylindrical fence 313 in which a notch 314 is defined so that a part of the notch 314 fits with an outer wall of the holder 11, and the at least two flexible feet 311 extend from the cylindrical fence 313. The protective cover 30 further includes a capping portion 314 configured to cover the notch 314, and the protective cover 30 includes a connection portion 35 configured to connect with the cylindrical fence 313 and the capping portion 34, as shown in FIG. 4. The connection portion 35 is manually snapped by a user so as to remove the capping portion 34 from the fitting portion 31.

The connection portion 35 has multiple elongated wings 351 configured to be manually snapped by twisting the capping portion 34.

With reference to FIG. 6, the positioning plate 20 further includes two locking orifices 27 defined on the peripheral side thereof. Referring to FIG. 9, each of the multiple connection portions 33 has a passing orifice 331 defined thereon, wherein the passing orifice 331 has a concaved fence 332 formed on an outer end thereof so as to guide a second screw bolt to screw with each of the two locking orifices 27 after the second screw bolt moves into the passing orifice 331, as illustrated in FIG. 4. The second screw bolt is configured to screw a decoration cover on the positioning plate 20 via the protective cover 30.

Figure 1:
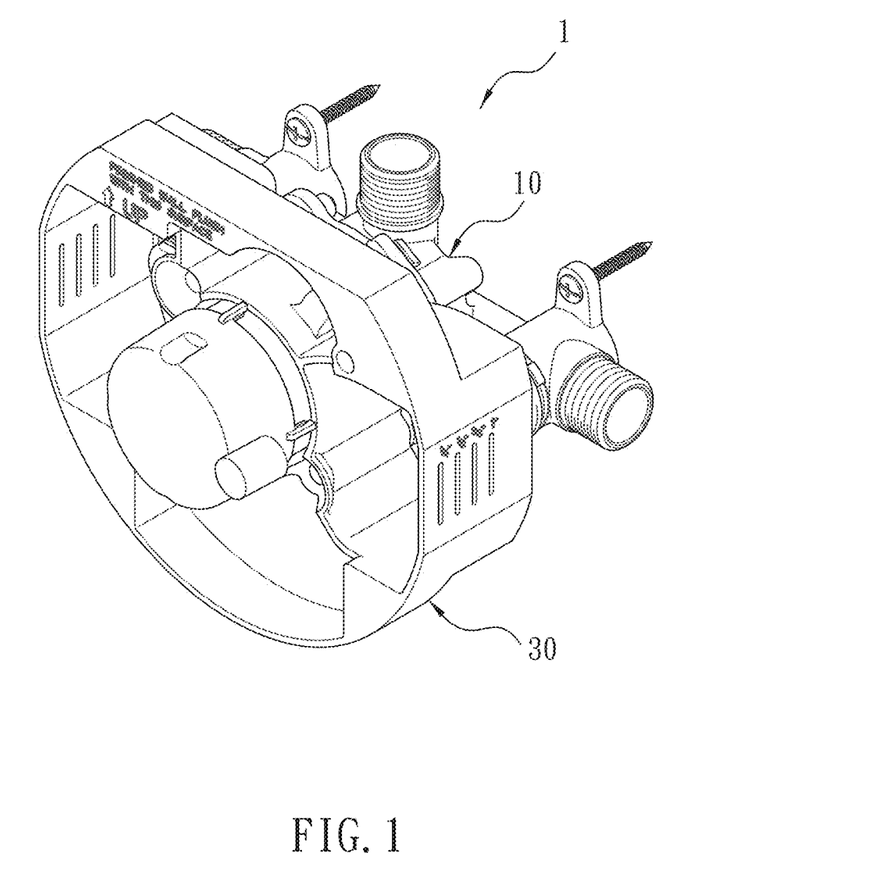
FIG. 1 is a perspective view showing the assembly of a valve assembly according to a first embodiment of the present invention.
Figure 2:
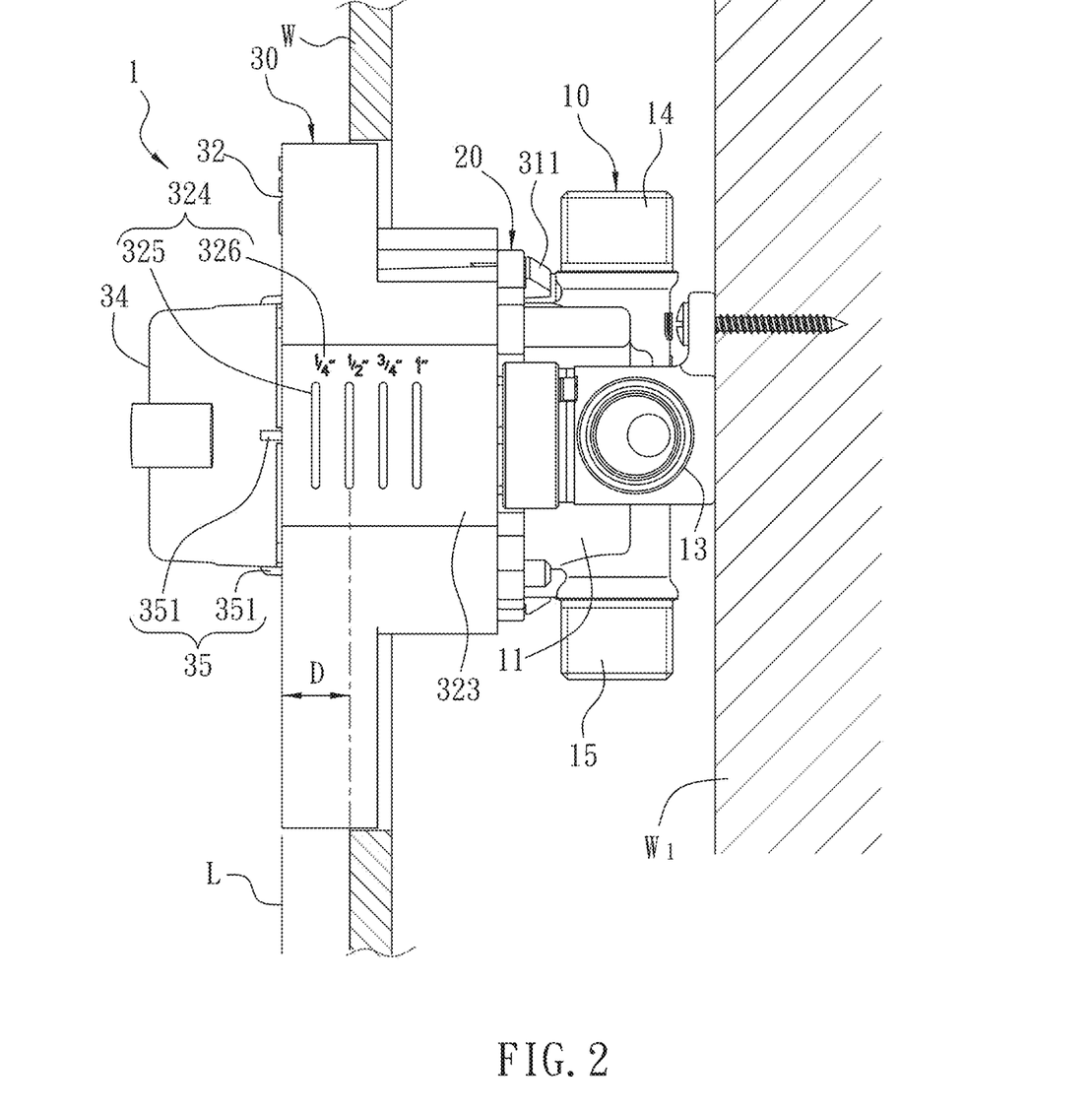
FIG. 2 is a cross sectional view showing the operation of the valve assembly according to the first embodiment of the present invention.
Figure 10:
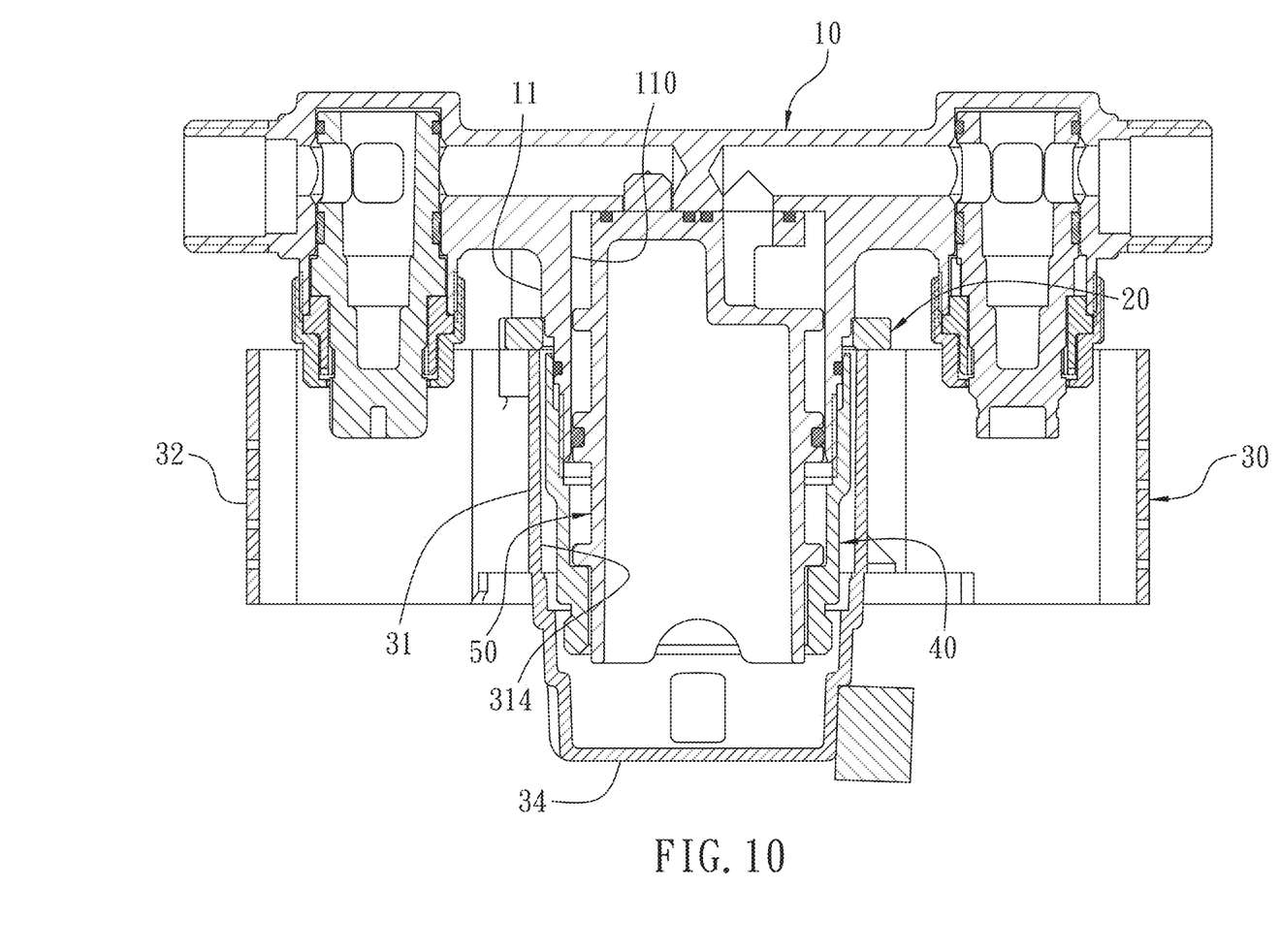
FIG. 10 is a cross sectional view showing the operation of a part of the valve assembly according to the first embodiment of the present invention.

With reference to FIGS. 3 and 4, the valve assembly 1 further comprises a screwing sleeve 40 configured to screw with the holder 11. The notch 314 of the protective cover 30 is fitted with the screwing sleeve 40. In a pressure test of the accommodation chamber 110 of the holder 11, a pressure testing cap 50 is housed in the accommodation chamber 110, as shown in FIG. 10, such that the screwing sleeve 40 forces the pressure testing cap 50 to accommodate in the accommodation chamber 110 so as to test whether air, the cold water, and the hot water leak out of the cold-water inflow pipe 2, the hot-water inflow pipe 3, the upper water tube 4 or the lower water tube 5. After constructing a finished wall, the mixing valve is housed in the accommodation chamber 110 and is forced by the screwing sleeve 40. As shown in FIG. 2, the finished wall is constructed on the basic wall W, such as adhering tiles, wherein an alignment line L represents an outer face of the finished wall and aligns with the front fence 322 of the protective cover 30.

The capping portion 34 is twisted and snapped after constructing the finished wall so that the mixing valve is accommodated in the accommodation chamber 110 via the notch 314 of the protective cover 30, and the screwing sleeve 40 is screwed with the holder 11, thereafter the decoration cover and the control bar are mounted.

Referring to FIG. 4, two arrows 202, 301 are marked on the positioning plate 20 and the front fence 322 of the protective cover 30 individually. Preferably, indicating characters, such as "UP" are marked on the front fence 322 so that the user knows the protective cover 30 is fixed upward.

Figure 11:
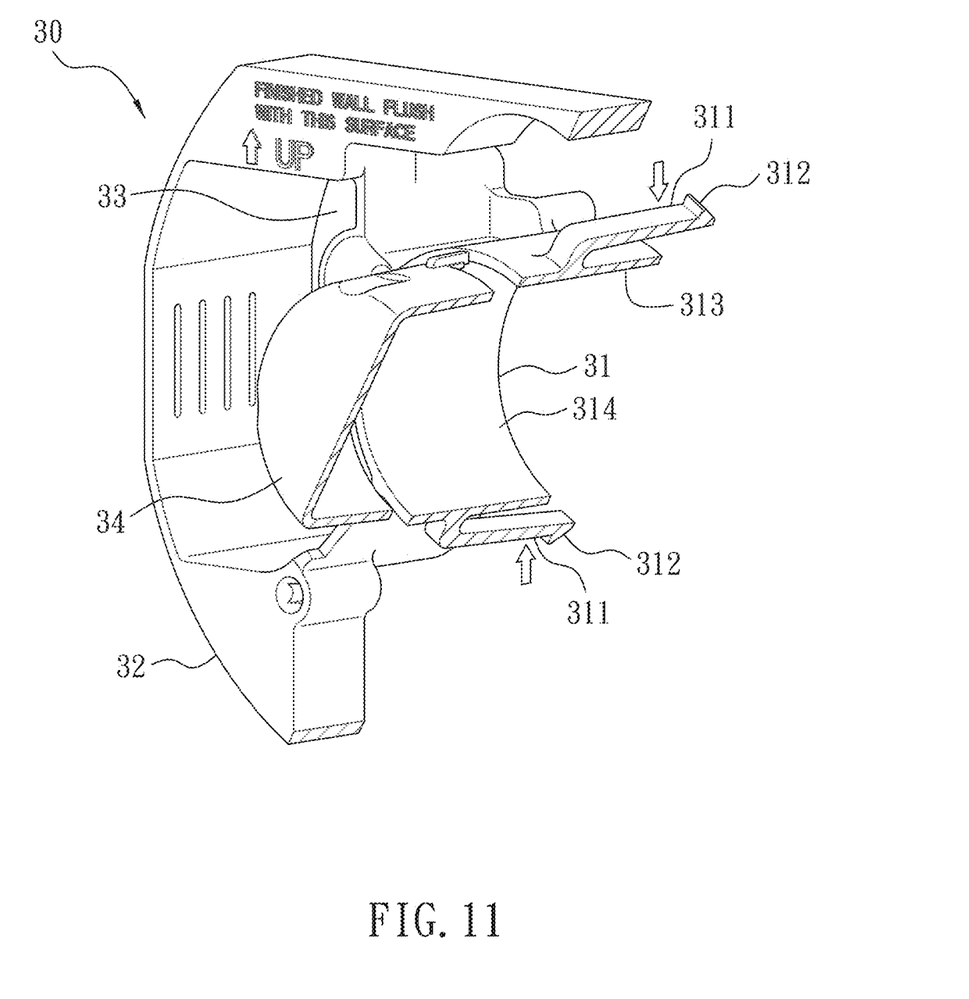
FIG. 11 is a cross-sectional perspective view showing the operation of the valve assembly according to the first embodiment of the present invention.

After the positioning plate 20 is connected with the body 10, it is not removable, and each flexible foot 311 retains with each recess 24 so as to fix the protective cover 30 with the positioning plate 20. As shown in FIG. 11, each flexible foot 311 is pressed so as to remove the hook 312 from the inner face 26 of the positioning plate 20 and each recess 24, thus removing the protective cover 30 from the positioning plate 20 easily and quickly.

As connecting the valve assembly 1, the cold-water inflow pipe 2, the hot-water inflow pipe 3, the upper water tube 4 and the lower water tube 5, the user learns a distance D between the basic wall W and the outer face of the finished wall by way of each indication part 324, as illustrated in FIG. 2. Accordingly, the outer face of the finished wall flushes with the front fence 322 of the protective cover 30 as connecting the valve assembly 1. Each indication part 324 of the protective cover 30 is capable of determining a fixing depth of the valve assembly 1 quickly by adjusting a thickness and a position of the wooden rack W1.

As shown in FIGS. 5 and 6, an angle between the first coupling portion 111 and the second coupling portion 112 of the holder 11 is 180 degrees, and an angle between the first fixing portion 22 and the second fixing portion 23 of the positioning plate 20 is 180 degrees, hence no matter the first outflow connector 14 is fixed upward or downward, the positioning plate 20 is connected with the body 10, and the arrow 202 faces upward.

Figure 12:
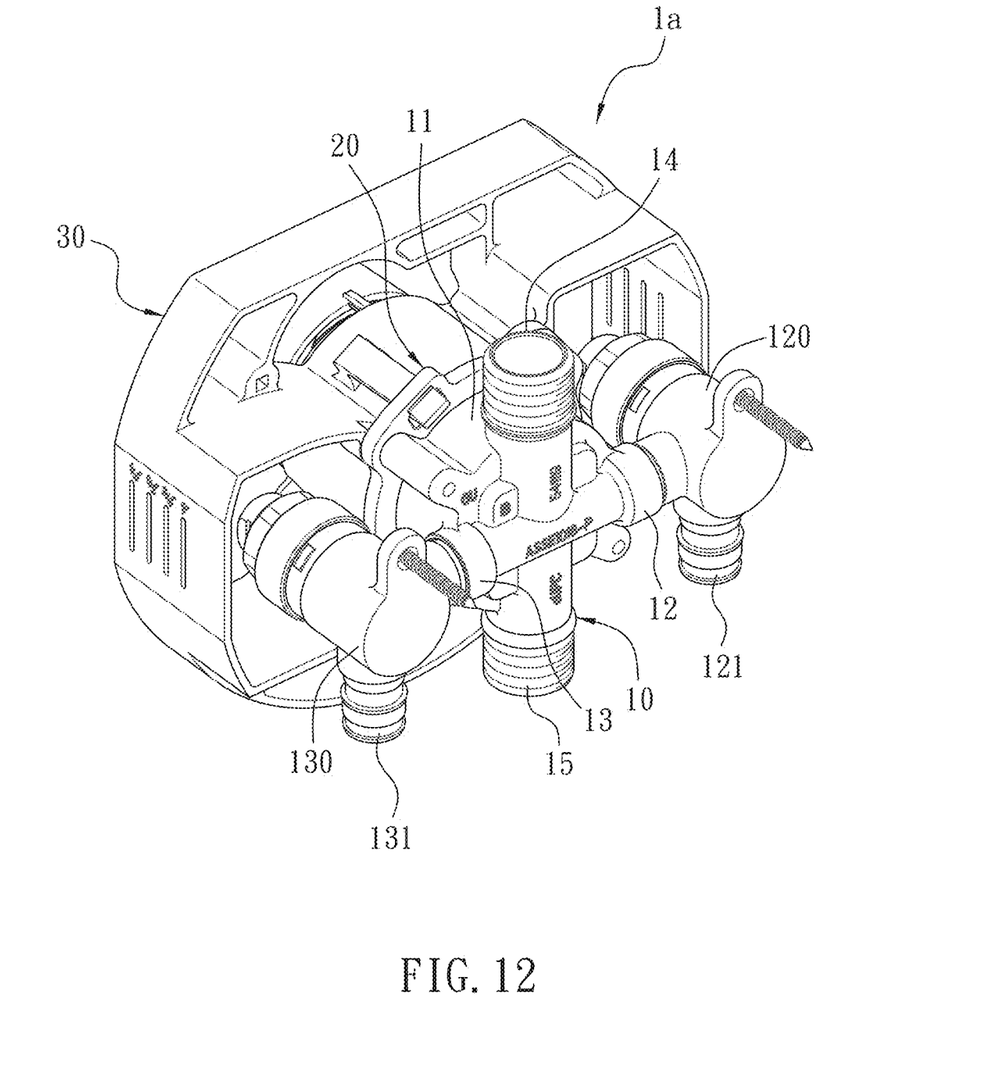
FIG. 12 is a perspective view showing the assembly of a valve assembly according to a second embodiment of the present invention.
Figure 13:
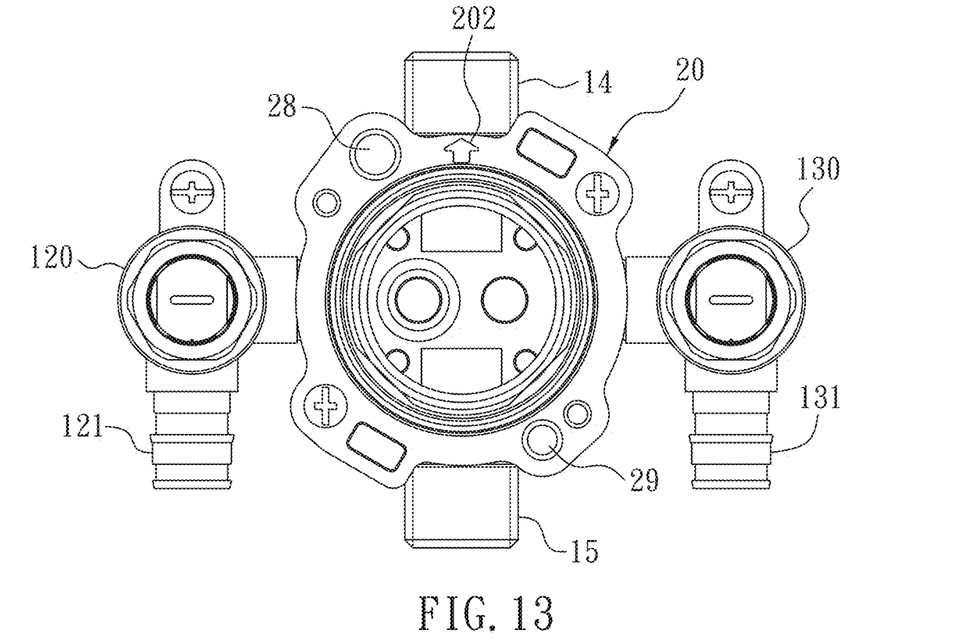
FIG. 13 is a side plane view showing the operation of the valve assembly according to the second embodiment of the present invention.
Figure 14:
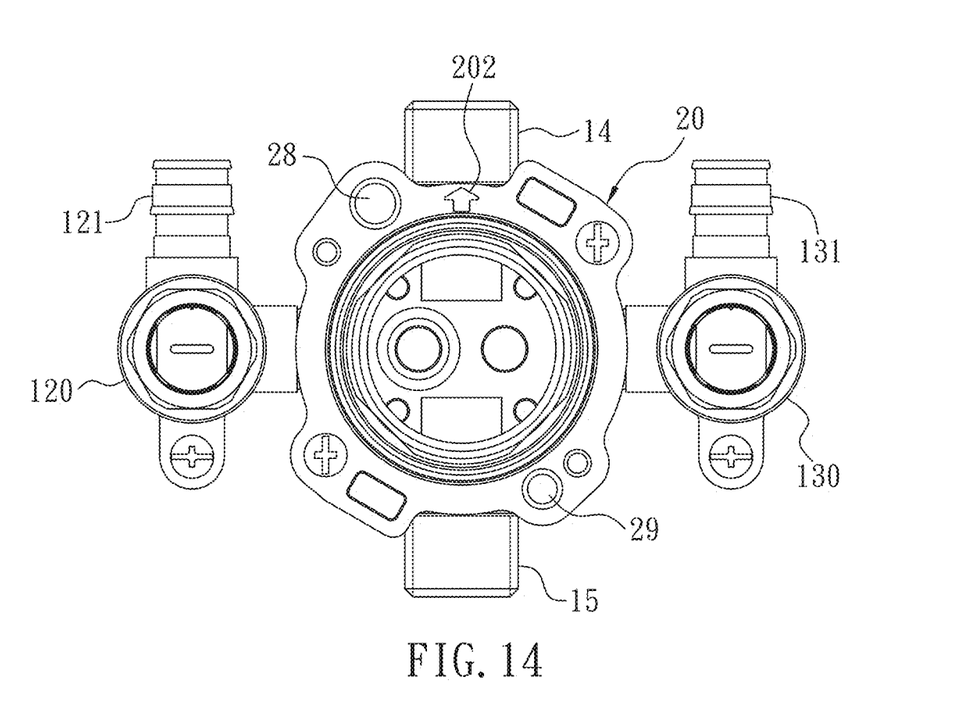
FIG. 14 is another side plane view showing the operation of the valve assembly according to the second embodiment of the present invention.

Referring to FIG. 12, a difference of a fixing structure for a protective cover 30 of a valve assembly 1a of a second embodiment from that of the first embodiment comprises: a body 10, and the body 10 including a cold-water inflow seat 121 vertically extending from the cold-water inflow connector 12, a hot-water inflow seat 131 vertically extending from the hot-water inflow connector 13, wherein when the body 10 is connected in a first direction, the cold-water inflow seat 121 and the hot-water inflow seat 131 vertically extend upward, as shown in FIGS. 13 and 14, and when the body 10 is connected in a second direction, the cold-water inflow seat 121 and the hot-water inflow seat 131 vertically extend downward.

When the valve assembly 1a is connected in the second direction, the arrow 202 of the positioning plate 20 faces upward and the positioning plate 20 is connected with the body 10. In other words, the cold-water inflow seat 121 and the hot-water inflow seat 131 of the body 10 vertically extend downward, and the arrow 202 of the positioning plate 20 faces upward. Thereafter, the arrow 301 of the protective cover 30 faces upward as fixing the protective cover 30.

An angle between the first coupling portion 111 and the second coupling portion 112 of the holder 11 is 180 degrees, and an angle between the first fixing portion 22 and the second fixing portion 23 of the positioning plate 20 is 180 degrees, hence no matter the body 10 is connected in the first direction or the second direction, the first coupling portion 111 and the second coupling portion 112 are replaceable by each other so that when the body 10 is connected in the first direction, the first fixing portion 22 and the second fixing portion 23 of the positioning plate 20 are coupled with the first coupling portion 111 and the second coupling portion 112 individually, and when the body 10 is connected in the second direction, the first fixing portion 22 and the second fixing portion 23 of the positioning plate 20 are in connection with the second coupling portion 112 and the first coupling portion 111 respectively. No matter the body 10 is connected in the first direction or the second direction, the positioning plate 20 is removed and is rotated 180 degrees upside down so as to face the arrow 202 upward, thereafter the protective cover 20 is fixed and the arrow 301 faces upward, as shown in FIGS. 13 and 14.

When the body 10 is connected in the first direction based on using requirements, the arrow 202 of the positioning plate 20 faces downward, and the positioning plate 20 is detached and is rotated 180 degrees upside down. Preferably, a foolproof device is defined between the protective cover 20 and the positioning plate 30 so as to avoid facing the arrow 301 of the protective cover 30 upward.

Figure 15:
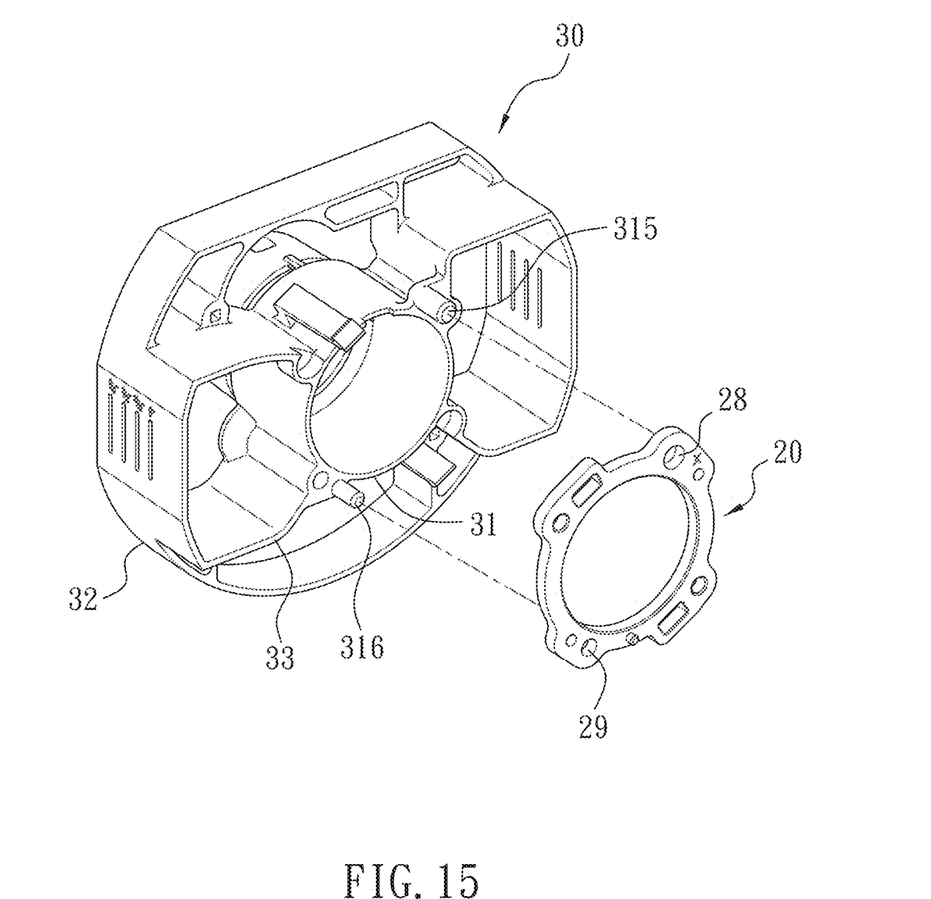
FIG. 15 is a perspective view showing the exploded components of a part of the valve assembly according to the second embodiment of the present invention.

With reference to FIG. 15, the foolproof device includes a first connecting orifice 28 and a second connecting orifice 29 which are arranged on the positioning plate 20 around the opening 21, a first affix bolt 315 and a second affix bolt 316 formed on an outer wall of the cylindrical fence 313 of the protective cover 30 so as to be inserted into the first connecting orifice 28 and the second connecting orifice 29 respectively, hence when the arrow 202 faces downward, the positioning plate 20 is not removed and rotated upside down, and the protective cover 30 is fixed by facing the arrow 301 upward, the first affix bolt 315 of the protective cover 30 cannot be inserted into the second connecting orifice 29 or/and the second affix bolt 316 cannot be inserted into the first connecting orifice 28.

A diameter of the first connecting orifice 28 is more than the second connecting orifice 29, and a shape of a cross section of first connecting orifice 28 is different from the second connecting orifice 29. A diameter of the first affix bolt 315 is more than the second affix bolt 316, and a shape of a cross section of the first affix bolt 315 is different from the second affix bolt 316.

The foolproof device of the second embodiment is applicable for fixing structure of the first embodiment.

Thereby, the foolproof device works when the arrow 202 of the positioning plate 20 is not consistent with the arrow 301 of the protective cover 30.

While the preferred embodiments of the invention have been set forth for the purpose of disclosure, modifications of the disclosed embodiments of the invention as well as other embodiments thereof may occur to those skilled in the art. The scope of the claims should not be limited by the preferred embodiments set forth in the examples, but should be given the broadest interpretation consistent with the description as a whole.

What is claimed is:

1. A fixing structure for a protective cover of a valve assembly comprising:
    a body including a holder, and the holder including a cold-water inflow connector horizontally extending from a first side thereof, a hot-water inflow connector horizontally extending from a second side of the holder opposite to the cold-water inflow connector, a first outflow connector vertically extending from a top of the holder, and a second outflow connector vertically extending from a bottom of the holder opposite to the first outflow connector; the cold-water inflow connector having a cold-water inflow seat configured to connect with a cold-water inflow pipe, and the hot-water inflow connector having a hot-water inflow seat configured to connect with a hot-water inflow pipe; the holder further including a first coupling portion and a second coupling portion extending on an outer wall thereof; and
    a positioning plate including an opening configured to fit with the holder of the body, and the positioning plate including a first fixing portion, a second fixing portion, and at least two recesses, wherein the first fixing portion is configured to connect with the first coupling portion, and the second fixing portion is configured to couple with the second coupling portion;
    the protective cover connected with the body, and the protective cover including a fitting portion configured to fit with the holder of the body; the fitting portion having at least two flexible feet arranged on the fitting portion so as to retain with the at least two recesses of the positioning plate respectively.

2. The fixing structure as claimed in claim 1, wherein the positioning plate is made of metal.

3. The fixing structure as claimed in claim 1, wherein the positioning plate is annular and includes the opening defined therein, and the positioning plate further includes the first fixing portion, the second fixing portion, and the at least two recesses formed around the opening.

4. The fixing structure as claimed in claim 3, wherein the holder of the body includes an abutting fence formed thereon and an aperture defined on the abutting fence; the positioning plate includes an outer face and an inner face configured to contact with the abutting fence, and the inner face has a column configured to insert into the aperture.

5. The fixing structure as claimed in claim 1, wherein each of the first coupling portion and the second coupling portion is a threaded hole; each of the first fixing portion and the second fixing portion is a through hole so that two first screw bolts respectively screw with the threaded hole of the first coupling portion and the threaded hole of the second coupling portion via the through hole of the first fixing portion and the through hole of the second fixing portion respectively, thus screwing the positioning plate on the holder.

6. The fixing structure as claimed in claim 1, wherein the positioning plate includes an outer face and an inner face; each of the at least two flexible feet has a hook formed on a distal end thereof so that each flexible foot retains with the inner face of the positioning plate via a respective recess after flexibly deforming.

7. The fixing structure as claimed in claim 1, wherein the protective cover further includes a peripheral portion surrounding the fitting portion, and multiple connection portions configured to connect with the fitting portion and the peripheral portion; wherein the peripheral portion has an external fence, a front fence, a marking portion formed on at least one side of the external fence, and multiple indication parts arranged on the marking portion and configured to denote depths relative to the front fence, respectively.

8. The fixing structure as claimed in claim 7, wherein each of the indication parts on the protective cover has at least one elongated element longitudinally arranged thereon.

9. The fixing structure as claimed in claim 8, wherein each elongated element is a through hole or a recessed slot.

10. The fixing structure as claimed in claim 8, wherein each elongated element is a rib.

11. The fixing structure as claimed in claim 8, wherein each indication part further has a size symbol corresponding to each elongated element so as to denote a depth between each elongated element and the front fence on the protective cover.

12. The fixing structure as claimed in claim 1, wherein the fitting portion of the protective cover has a cylindrical fence in which a notch is defined so that a part of the notch fits with the outer wall of the holder, and the at least two flexible feet extend from the cylindrical fence; the protective cover further includes a capping portion configured to cover the notch, and the protective cover includes a connection portion configured to connect with the cylindrical fence and the capping portion; the connection portion is manually snapped by a user so as to remove the capping portion from the fitting portion.

13. The fixing structure as claimed in claim 12, wherein the connection portion has multiple elongated wings configured to be manually snapped by twisting the capping portion.

14. The fixing structure as claimed in claim 12, wherein the positioning plate further includes two locking orifices defined on a peripheral side thereof; the protective cover has a passing orifice defined thereon, wherein the passing orifice has a concaved fence formed on an outer end thereof so as to guide a second screw bolt to screw with a respective locking orifice, after the second screw bolt moves into the passing orifice.

15. The fixing structure as claimed in claim 12 further comprising a screwing sleeve configured to screw with the holder, and the notch of the protective cover is fitted with the screwing sleeve.

16. The fixing structure as claimed in claim 1, wherein an angle between the first coupling portion and the second coupling portion of the holder is 180 degrees, and an angle between the first fixing portion and the second fixing portion of the positioning plate is 180 degrees, hence the first fixing portion and the second fixing portion of the positioning plate are coupled with the first coupling portion and the second coupling portion respectively, alternatively, the first fixing portion and the second fixing portion of the positioning plate are coupled with the second coupling portion and the first coupling portion respectively.

17. The fixing structure as claimed in claim 1, wherein when the cold-water inflow seat of the body vertically extends upward from the cold-water inflow connector and the hot-water inflow seat vertically extends upward from the hot-water inflow connector, the body is connected in a first orientation; and when the cold-water inflow seat of the body vertically extends downward from the cold-water inflow connector and the hot-water inflow seat vertically extends downward from the hot-water inflow connector, the body is connected in a second orientation; an angle between the first coupling portion and the second coupling portion of the holder is 180 degrees so that when the body is connected in the first orientation or the second orientation, the first coupling portion and the second coupling portion are replaceable by each other; and an angle between the first fixing portion and the second fixing portion of the positioning plate is 180 degrees, hence when the body is connected in the first orientation, the body is coupled with the first coupling portion and the second coupling portion to the first fixing portion and the second fixing portion of the positioning plate respectively, alternatively, when the body is connected in the second orientation, the body is coupled with the second coupling portion and the first coupling portion to the first fixing portion and the second fixing portion of the positioning plate respectively.

18. The fixing structure as claimed in claim 17, wherein a diameter of a first connecting orifice on the positioning plate is different from a diameter of a second connecting orifice on the positioning plate.

19. The fixing structure as claimed in claim 17, wherein a shape of a cross section of a first connecting orifice on the positioning plate is different from a shape of a cross section of a second connecting orifice on the positioning plate.

20. The fixing structure as claimed in claim 17 further comprising the fitting portion having a first affix bolt and a second affix bolt formed on an outer wall of a cylindrical fence of the fitting portion, so as to be inserted into a first connecting orifice on the positioning plate and a second connecting orifice on the positioning plate respectively; a diameter of the first affix bolt is different from a diameter of the second affix bolt, and a shape of a cross section of the first affix bolt is different from a shape of a cross section of the second affix bolt.

21. The fixing structure as claimed in claim 20, wherein the positioning plate includes an outer face and an inner face; each of the at least two flexible feet has a hook formed on a distal end thereof so that each flexible foot retains with the inner face of the positioning plate via a respective recess after flexibly deforming.

22. The fixing structure as claimed in claim 20, wherein the fitting portion of the protective cover has the cylindrical fence, and the at least two flexible feet, the first affix bolt, and the second affix bolt extend from the cylindrical fence, and the cylindrical fence has a notch defined thereon so that a part of the notch fits with the outer wall of the holder, and the at least two flexible feet extend from the cylindrical fence; the protective cover further includes a capping portion configured to cover the notch, and the protective cover includes a connection portion configured to connect with the cylindrical fence and the capping portion; the connection portion is manually snapped by a user so as to remove the capping portion from the fitting portion.

23. The fixing structure as claimed in claim 22, wherein the connection portion has multiple elongated wings configured to be manually snapped by twisting the capping portion.

24. The fixing structure as claimed in claim 22, wherein the positioning plate further includes two locking orifices defined on a peripheral side thereof; the protective cover has a passing orifice defined thereon, wherein the passing orifice has a concaved fence formed on an outer end thereof so as to guide a second screw bolt to screw with a respective locking orifices, after the second screw bolt moves into the passing orifice.

25. The fixing structure as claimed in claim 22 further comprising a screwing sleeve configured to screw with the holder, and the notch of the protective cover is fitted with the screwing sleeve.

26. The fixing structure as claimed in claim 20, wherein the protective cover further includes a peripheral portion surrounding the fitting portion, and multiple connection portions configured to connect with the fitting portion and the peripheral portion; wherein the peripheral portion has an external fence, a front fence, a marking portion formed on at least one side of the external fence, and multiple indication parts arranged on the marking portion and configured to denote depths relative to the front fence respectively.

27. The fixing structure as claimed in claim 26, wherein each of the multiple indication parts has at least one elongated element longitudinally arranged thereon.

28. The fixing structure as claimed in claim 26, wherein each elongated element is a through hole or a recessed slot.

29. The fixing structure as claimed in claim 26, wherein each elongated element is a rib.

30. The fixing structure as claimed in claim 26, wherein each indication part further has a size symbol corresponding to each elongated element so as to denote a depth between each elongated element and the front fence.

* * * * *